United States Patent
Kwon et al.

(10) Patent No.: US 12,530,169 B2
(45) Date of Patent: Jan. 20, 2026

(54) ELECTRONIC DEVICE AND CONTROL METHOD THEREFOR USING QUANTIZED KERNEL DATA

(71) Applicant: SAMSUNG ELECTRONICS CO., LTD., Suwon-si (KR)

(72) Inventors: Kiseok Kwon, Suwon-si (KR); Youngrae Cho, Suwon-si (KR); Jaeun Park, Suwon-si (KR); Chulsoo Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1075 days.

(21) Appl. No.: 17/508,697

(22) Filed: Oct. 22, 2021

(65) Prior Publication Data

US 2022/0043630 A1 Feb. 10, 2022

Related U.S. Application Data

(63) Continuation of application No. PCT/KR2020/011404, filed on Aug. 26, 2020.

(30) Foreign Application Priority Data

Dec. 16, 2019 (KR) .................. 10-2019-0167599

(51) Int. Cl.
*G06F 7/501* (2006.01)
*G06F 7/523* (2006.01)
(Continued)

(52) U.S. Cl.
CPC .............. *G06F 7/501* (2013.01); *G06F 7/523* (2013.01); *G06F 17/153* (2013.01); *G06N 3/04* (2013.01); *G06N 3/0495* (2023.01); *G06N 3/063* (2013.01)

(58) Field of Classification Search
CPC ........ G06F 7/501; G06F 7/523; G06F 17/153; G06F 7/53; G06F 7/533; G06F 17/15;
(Continued)

(56) References Cited

U.S. PATENT DOCUMENTS 5,511,015 A * 4/1996 Flockencier ............ G06F 17/15
708/315
9,805,304 B2 10/2017 Ross
(Continued)

FOREIGN PATENT DOCUMENTS

CN 108564165 A 9/2018
CN 109543830 A 3/2019
(Continued)

OTHER PUBLICATIONS

International Search Report (PCT/ISA/210) issued by the International Searching Authority in International Application No. PCT/KR2020/011404, issued on Dec. 3, 2020.
(Continued)

*Primary Examiner* — Emily E Larocque
*Assistant Examiner* — Maria De Jesus Rivera
(74) *Attorney, Agent, or Firm* — Sughrue Mion, PLLC

(57) ABSTRACT

An electronic device and a method of controlling thereof are provided. The electronic device includes a memory configured to store coefficient data and identification code data in which kernel data is quantized; a first operation circuit configured to, based on a plurality of target elements of target data being sequentially input, select an output value corresponding to at least one of the plurality of target elements that is sequentially input according to an identification code corresponding to the one of the plurality of target elements, and accumulate the selected output value; and a second operation circuit configured to output a convolution operation result based on output data that is output
(Continued)

from the first operation circuit and a coefficient corresponding to the output data.

15 Claims, 12 Drawing Sheets

(51) Int. Cl.
*G06F 17/15* (2006.01)
*G06N 3/04* (2023.01)
*G06N 3/0495* (2023.01)
*G06N 3/063* (2023.01)

(58) Field of Classification Search
CPC .................. G06F 7/5443; G06F 17/16; G06F 2207/4824; G06F 9/3001; G06F 9/30036; G06F 9/3885; G06F 17/10; G06F 17/142; G06F 9/30018; G06F 15/8046; G06F 9/3893; G06F 7/485; G06F 2212/454; G06F 7/527; G06F 13/1673; G06F 2207/4812; G06F 7/4876; G06N 3/04; G06N 3/063; G06N 3/045; G06N 3/0464; G06N 3/02; G06N 3/08; G06N 3/10; G06N 3/048; G06N 20/10; G06N 3/0495; G06N 3/0442; G06T 1/20; G06V 10/82; H04L 27/2628; H04L 27/265; H03M 13/6502

See application file for complete search history.

(56) References Cited

U.S. PATENT DOCUMENTS

| | | | |
|---|---|---|---|
| 10,180,820 B2 | 1/2019 | Buchanan et al. | |
| 10,241,837 B2 | 3/2019 | Huang et al. | |
| 10,699,160 B2 | 6/2020 | Lee et al. | |
| 10,725,934 B2* | 7/2020 | Henry | G06N 3/045 |
| 10,977,338 B1* | 4/2021 | Duong | G06N 3/084 |
| 11,003,985 B2 | 5/2021 | Kim et al. | |
| 11,604,973 B1* | 3/2023 | Sather | G06F 17/16 |
| 11,625,581 B2* | 4/2023 | Gibson | G06N 3/0495 |
| | | | 706/31 |
| 2018/0121795 A1 | 5/2018 | Kato et al. | |
| 2018/0129935 A1 | 5/2018 | Kim et al. | |
| 2018/0232627 A1 | 8/2018 | Rozen et al. | |
| 2018/0349764 A1* | 12/2018 | Zhang | G06N 3/063 |
| 2019/0102671 A1 | 4/2019 | Cohen et al. | |
| 2019/0180167 A1 | 6/2019 | Huang et al. | |
| 2019/0303749 A1* | 10/2019 | Appuswamy | G06F 17/16 |
| 2019/0332356 A1* | 10/2019 | Chen | G06N 3/08 |
| 2019/0340010 A1 | 11/2019 | Lee et al. | |
| 2021/0357736 A1* | 11/2021 | Lu | G06N 3/0464 |

FOREIGN PATENT DOCUMENTS

| | | | |
|---|---|---|---|
| KR | 10-2018-0036587 A | 4/2018 | |
| KR | 10-2018-0052063 A | 5/2018 | |
| KR | 10-2019-0022237 A | 3/2019 | |
| KR | 10-2019-0074938 A | 6/2019 | |
| KR | 10-2019-0090858 A | 8/2019 | |

OTHER PUBLICATIONS

Written Opinion (PCT/ISA/237) issued by the International Searching Authority in International Application No. PCT/KR2020/011404, issued on Dec. 3, 2020.
Chen Xu et al., "Alternationg Multi-Bit Quantization for Recurrent Neural Networks", ICLR, Feb. 1, 2018, pp. 1-13 (13 pages total).
Yu-Hsin Chen et al., "Eyeriss: A Spatial Architecture for Energy-Efficient Dataflow for Convolutional Neural Networks", 2016, pp. 1-13 (13 pages total).
Norman P. Jouppi et al., "In-Datacenter Performance Analysis of a Tensor Processing Unit", 2017, pp. 1-17 (17 pages total).
Bert Moons et al., "ENVISION: A0.26-to-10TOPS/W Subword-Parallel Dynamic-Voltage-Accuracy-Frequency-Scalable Convolutional Neural Network Processor in 28nm FDSOI", ISSCC, Feb. 7, 2017, pp. 15-17 (3 pages total).
Kiseok Kwon et al., "Co-design of Deep Neural Nets and Neural Net Accelerators for Embedded Vision Applications", DAC '18, Jun. 24-29, 2018, San Francisco, CA, USA, pp. 1-6 (6pages total).
Yu-Hsin Chen et al., "Eyeriss: An Energy-Efficient Reconfigurable Accelerator for Deep Convolutional Neural Networks", IEEE Journal of Solid State Circuits, 2016, pp. 1-12 (12 pages total).
Mark Horowitz, "Computing's Energy Problem (and what we can do about it)", IEEE International Solid-State Circuits Conference, Feb. 10, 2014, pp. 10-14 (5 pages total.
Communication dated Jun. 19, 2025, issued by the Korean Intellectual Office in Korean Application No. 10-2019-0167599.
Zhu et al., "Trained Ternary Quantization", International Conference on Learning Representations 2017, Feb. 23, 2017, pp. 1-10 (10 pages total).

* cited by examiner

ELECTRONIC DEVICE AND CONTROL METHOD THEREFOR USING QUANTIZED KERNEL DATA

CROSS-REFERENCE TO RELATED APPLICATION(S)

This application is a by-pass continuation of PCT International Application No. PCT/KR2020/011404, filed on Aug. 26, 2020, and is based on and claims priority under 35 U.S.C. § 119(a) to Korean Patent Application No. 10-2019-0167599, filed on Dec. 16, 2019 in the Korean Intellectual Property Office, the disclosures of which are incorporated by reference herein in their entirety.

BACKGROUND

1. Field

The disclosure relates to an electronic apparatus that uses machine learning algorithms such as deep learning to perform convolution operations of artificial intelligence (AI) systems and applications of artificial intelligence (AI) systems that simulate functions such as cognition, determination, or the like of human brain, and a control method thereof.

2. Description of Related Art

Recently, the use of artificial intelligence models in various fields is rapidly increasing. Particularly, a convolutional neural network (CNN) including a plurality of convolutional layers among artificial intelligence models is widely used for image processing or the like.

As shown in FIG. 1, the convolution layer may perform convolution using a plurality of three-dimensional kernels (filters) (N Convolution Kernels) on three-dimensional input data (input feature map) to output three-dimensional data (output feature map). This may be expressed by Equation 1 as follows.

$$O[x][y][z] = \sum_{i}^{F_W} \sum_{j}^{F_H} \sum_{k}^{I_D} [x+i][y+j][k] \times W[i][j][k][z] \quad \text{[Equation 1]}$$

Here, I may be a three-dimensional data (input feature map) which contains $I_W \times I_H \times I_D$ input activation value, O may be a three-dimensional data (output feature map) which contains $O_W \times O_H \times O_D$ output activation value, W may be four-dimensional data containing weights of $O_D$ kernels with a size of $F_W \times F_H \times F_D$, i may indicate a x-axis, j may indicate a y-axis, k may indicate a z-axis, and z may be an identifier indicating a kernel.

In other words, as a total of $F_W \times F_H \times I_D \times O_W \times O_H \times O_D$ massive multiply-and-accumulate (MAC) operations are required to process the convolutional layer, most of convolutional neural network processing hardware (accelerator) may include a connection structure with a variety of memory for efficient access to the massive MAC operator and data. Accordingly, the convolutional neural network processing hardware has a problem in that a hardware area and energy consumption increase.

In addition, there is a problem in that energy consumption increases as one piece of data is repeatedly used. For example, one kernel weight (W[i][j][k][z]) may be used $O_W \times O_H$ times, and one input pixel (I[x+i][y+j][k]) may be used $F_W \times F_H \times O_D$ times. Particularly, energy consumed to store repeatedly used data in higher-level memory (such as dynamic random access memory (DRAM)) and read or write data from it has a problem that is tens to hundreds times bigger than when using a low-level memory (e.g., static random access memory (SRAM)).

Therefore, research is being conducted to reduce the hardware area and energy consumption.

SUMMARY

Provided are an electronic apparatus that minimizes a multiplication operation in a process of performing a convolution operation of an artificial intelligence model, and a control method thereof.

Additional aspects will be set forth in part in the description which follows, and in part, will be apparent from the description, or may be learned by practice of the presented embodiments.

In accordance with an aspect of the disclosure, there is provided an electronic apparatus including: a memory configured to store coefficient data and identification code data in which kernel data is quantized; a first operation circuit configured to, based on a plurality of target elements of target data being sequentially input, select an output value corresponding to at least one of the plurality of target elements that is sequentially input according to an identification code corresponding to the one of the plurality of target elements, and accumulate the selected output value; and a second operation circuit configured to output a convolution operation result based on output data outputted from the first operation circuit and a coefficient corresponding to the output data.

The first operation circuit is further configured to, based on the identification code corresponding to the one of the plurality of target elements, select, as the output value, one of a zero value, the one of the plurality of target elements, and an inversion value of the one of the plurality of target elements.

The first operation circuit is further configured to, based on the selected output value being accumulated sequentially for a predetermined number of times, output the accumulated data as the output data.

The second operation circuit is further configured to, based on a plurality of output data being sequentially input from the first operation circuit, perform a multiplication operation on the coefficient corresponding to one of the plurality of output data and the one of the plurality of output data, accumulate a multiplication result of the multiplication operation and output an accumulation result as the convolution operation result.

The identification code data includes a plurality of identification codes, each of which is represented as one of −1, 0, or 1, and the coefficient data includes a plurality of coefficients indicating each of the plurality of elements included in the kernel data based on the plurality of identification codes.

The first operation circuit includes: a plurality of multiplexers; an adder circuit configured to add outputs of the plurality of the multiplexers; and a first accumulator circuit configured to obtain the output data by accumulating outputs of the adder, wherein each of the plurality of multiplexers is configured to output one of the zero value, the one of the plurality of target elements, and the inversion value of the one of the plurality of target elements, based on the identification code corresponding to the one of the plurality of target elements.

The second operation circuit includes: a multiplier circuit configured to perform a multiplication operation on a coefficient corresponding to the output data among the output data and the coefficient data; and a second accumulator circuit configured to accumulate the output of the multiplier circuit to obtain the result of the convolution operation.

The memory is configured to further store another coefficient data and another identification code data in which another kernel data is quantized, and the electronic apparatus further includes: a third operation circuit configured to, based on the plurality of target elements of the target data being sequentially input, select another output value corresponding to at least another one of the plurality of target elements that is sequentially input according to another identification code corresponding to the another of the plurality of target elements, and accumulate the selected another output value; and a fourth operation circuit configured to output the convolution operation result, based on another coefficient corresponding to the another output data output from the third operation circuit and the another coefficient data.

The first operation circuit and the third operation circuit are configured to sequentially receive the same target element among the plurality of target elements included in the target data.

The memory further includes: a first buffer storing the coefficient data; and a second buffer storing the identification code data, wherein the first operation circuit is configured to receive an identification code corresponding to the inputted target element from the second buffer, and wherein the second operation circuit is configured to receive a coefficient corresponding to the output data from the first buffer.

In accordance with an aspect of the disclosure, there is provided a method for controlling an electronic apparatus including a memory, a first operation circuit and a second operation circuit. The method includes storing coefficient data and identification code data in which kernel data is quantized; based on a plurality of target elements of target data being sequentially input, selecting an output value corresponding to at least one of the plurality of target elements based on an identification code corresponding to the one of the plurality of target elements, and accumulating the selected output value, by the first operation circuit; and outputting a convolution operation result based on output data outputted from the first operation circuit and a coefficient corresponding to the output data, by the second operation circuit.

The accumulating the selected output value includes, based on the identification code corresponding to the one of the plurality of target elements, selecting, as the output value, one of a zero value, the one of the plurality of target elements, and an inversion value of the one of the plurality of target elements.

The accumulating the selected output value includes, based on the selected output value being accumulated sequentially for a predetermined number of times, outputting the accumulated data as the output data.

The outputting the convolution operation result includes, based on a plurality of output data being sequentially input from the first operation circuit, performing a multiplication operation on the coefficient corresponding to one of the plurality of output data and the one of the plurality of output data, accumulating a multiplication result of the multiplication operation and outputting an accumulation result as the convolution operation result.

The identification code data includes a plurality of identification codes each of which is represented as one of −1, 0, or 1, and the coefficient data includes a plurality of coefficients indicating each of the plurality of elements included in the kernel data based on the plurality of identification codes.

BRIEF DESCRIPTION OF THE DRAWINGS

The above and other aspects, features and advantages of certain embodiments of the disclosure will be more apparent from the following description taken in conjunction with the accompanying drawings in which.

DETAILED DESCRIPTION

Hereinafter, the disclosure will be described in detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

In the present disclosure, the terms "include" and "comprise" designate the presence of features, numbers, steps, operations, components, elements, or a combination thereof that are written in the disclosure, but do not exclude the presence or possibility of addition of one or more other features, numbers, steps, operations, components, elements, or a combination thereof.

The expression "at least one of a, b or c" indicates only a, only b, only c, both a and b, both a and c, both b and c, or all of a, b, and c.

The expression "first", "second" or the like as used herein may modify a variety of elements, irrespective of order and/or importance thereof, and only to distinguish one element from another, without limiting the corresponding elements.

Singular forms are intended to include plural forms unless the context clearly indicates otherwise. In the present disclosure, the terms "include" and "comprise" designate the presence of features, numbers, steps, operations, components, elements, or a combination thereof that are written in the disclosure, but do not exclude the presence or possibility of addition of one or more other features, numbers, steps, operations, components, elements, or a combination thereof.

Also, the term "user" may refer to a person who uses an electronic apparatus or an apparatus (e.g., an artificial intelligence (AI) electronic apparatus) that uses the electronic apparatus.

Hereinafter, embodiments will be described in greater detail with reference to the accompanying drawings.

Figure 2:
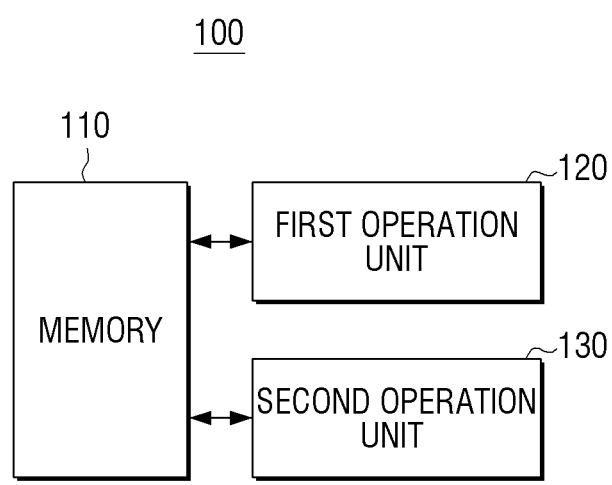
FIG. 2 is a block diagram illustrating an electronic apparatus according to an embodiment.

FIG. 2 is a block diagram illustrating an electronic apparatus 100 according to an embodiment.

The electronic apparatus 100 is a device that performs a convolution operation of a convolution layer included in an artificial intelligence model, and may be implemented as a system on chip (SOC) that performs a convolution operation, and may be implemented as a central processing unit (CPU), a graphic processing unit (GPU), a digital signal processor (DSP), a neural processing unit (NPU), etc., or may be implemented in the form of a circuit or a configuration inside a chip.

However, it is not limited thereto, and the electronic apparatus 100 may be any device capable of performing a convolution operation. For example, the electronic apparatus 100 may be a device such as a desktop PC, a notebook computer, a server, a smart phone, a tablet PC, a TV, smart glasses, a smart watch, or the like.

As shown in FIG. 2, the electronic apparatus 100 includes a memory 110, a first operation unit 120, and a second operation unit 130.

The memory 110 may store target data. The target data may refer to target data to be processed by an artificial intelligence model, and may be, for example, data such as an image or a video.

The memory 110 may store coefficient data and identification code data in which kernel data is quantized. Particularly, the memory 110 may store coefficient data and identification code data in which kernel data included in a convolution layer among a plurality of layers included in the artificial intelligence model is quantized. Here, the kernel data is data for processing target data and may be weight data included in the artificial intelligence model.

A predetermined number of elements included in the kernel data may be converted into a predetermined number of identification codes indicating one coefficient and a predetermined number of elements, respectively. Here, the identification code data may include a plurality of identification codes each represented by one of −1, 0, and 1, and the coefficient data may include a plurality of coefficients indicating each of a plurality of elements included in the kernel data based on the plurality of identification codes. In other words, coefficients obtained by quantizing kernel data in units of a predetermined number are coefficient data, and identification codes obtained by transforming each data included in the kernel data are identification code data. As a predetermined number of elements included in the kernel data are expressed as one coefficient, a quantization error may occur.

The memory 110 may be implemented as a non-volatile memory or a volatile memory, but is not limited thereto. For example, a hard disk may be used instead of the memory 110, and any configuration may be used as long as it can store data.

When a plurality of target elements of the target data are sequentially input, the first operation unit 110 may select an output value corresponding to the sequentially input target element based on an identification code corresponding to the input target element from among the identification code data, and accumulate the selected output values.

For example, when the identification code data includes a plurality of identification codes each of which is represented by one of −1, 0, and 1, the first operation unit 120 may select one of a zero value, a sequentially input target element, and an inversion value of the sequentially input target element as an output value, based on the identification code corresponding to the input target element.

However, the one or more embodiments are not limited thereto, and when the identification code data includes a plurality of identification codes expressed as one of 0 and 1, the first operation unit 120 may select one of the zero value and the sequentially input target elements as an output value, based on the identification code corresponding to the input target element.

The identification code data may include a plurality of identification codes represented by one of −1 and 0, and the identification code data may include a plurality of identification codes represented by one of −1 and 1. The first operation unit 120 may select a corresponding output value according to a data type of the identification code data. Hereinafter, it will be described that the identification code data includes a plurality of identification codes represented by one of −1, 0, and 1 for convenience of description.

When the sequentially selected output values are accumulated for a predetermined number of times, the first operation unit 120 may output the accumulated data as output data. Here, the predetermined number may vary according to a quantization method of kernel data.

An operation of the first operation unit 120 may be substantially viewed as a multiplication operation. For example, if the identification code is 1, the first operation unit 120 may output a target element, and this may be regarded as a multiplication operation of the target element and 1. Also, if the identification code is −1, the first operation unit 120 may output an inversion value of the target element, and this may be regarded as a multiplication operation of the target element and −1. Also, if the identification code is 0, the first operation unit 120 may output 0, and this may be regarded as a multiplication operation of the target element and 0. The first operation unit 120 may perform a selection operation using a multiplexer instead of the multiplication operation of the target element and the identification code, and as the MAC operator is not used, hardware area and energy consumption may be reduced.

The second operation unit 130 may output a convolution operation result based on a coefficient corresponding to the output data among the output data and the coefficient data output from the first operation unit 120.

For example, when a plurality of output data is sequentially input from the first operation unit 120, the second operation unit 130 may perform multiplication on the output data sequentially input with coefficients corresponding to the output data sequentially inputted, and cumulate a result of the operation as a result of a convolution operation. Here, the cumulative number of calculation results of the second operation unit 130 may vary according to a quantization method of the kernel data.

Figure 1:
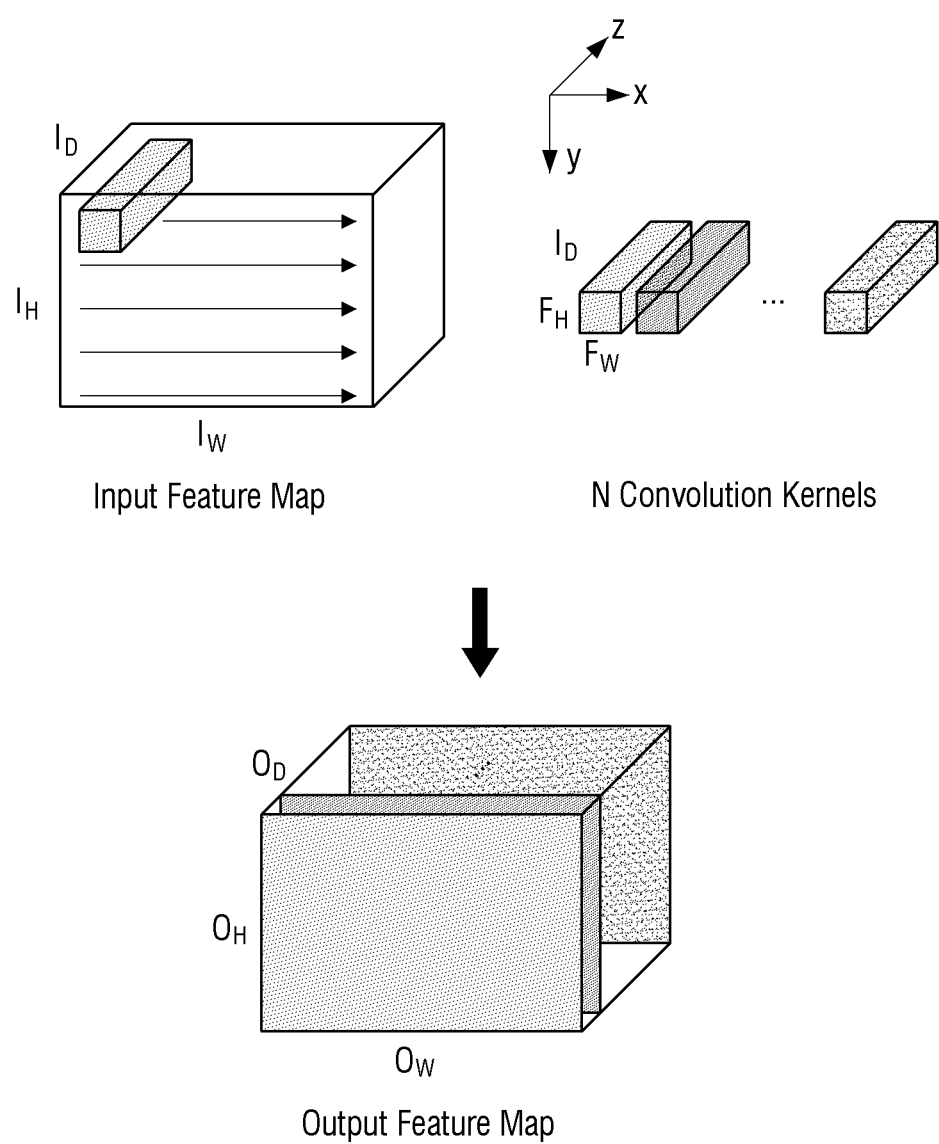
FIG. 1 is a view illustrating a convolution operation.

The convolution operation result output from the second operation unit 130 through the above method represents one of the three-dimensional data ($O_D$, $O_H$, $O_W$ of the output feature map) of FIG. 1. The electronic apparatus 100 may acquire the 3D data of FIG. 1 by repeating the above method.

The first operation unit 120 may include a plurality of multiplexers, an adder for adding outputs of the plurality of multiplexers, and a first accumulator for accumulating outputs of the adders to obtain output data. The multiplexer is a logic circuit that outputs one of a plurality of inputs, the adder is a logic circuit that adds one or more of a plurality of inputs that are simultaneously input and outputs an added value, and the accumulator is a logic circuit that accumulates a plurality of inputs that are sequentially input and outputs a plurality of accumulated inputs.

Each of the plurality of multiplexers may output one of a zero value, an input target element, and an inversion value of the input target element as an output value based on an identification code corresponding to the input target element among the identification code data.

In other words, since the first operation unit 120 includes the plurality of multiplexers, it may reduce a processing time of the operation of accumulating the selected data for a predetermined number of times. For example, assuming that the first operation unit 120 includes one multiplexer and the predetermined number of times is 10, the first operation unit 120 performs the accumulation operation for as much as ten times the unit time for accumulating the selected data. With respect to this, assuming that the first operation unit 120 includes five multiplexers and the predetermined number of times is 10, the first operation unit 120 may process five target elements for a unit time for accumulating the selected data. In other words, the first operation unit 120 may perform the accumulation operation for only twice the unit time for accumulating the selected data. An effect of improving a processing speed as described above is due to parallel processing using a plurality of multiplexers and addition operation by the adder.

However, the one or more embodiments are not limited thereto, and the first operation unit 120 may include only one multiplexer and a first accumulator. In this case, since a plurality of data is not output from the plurality of multiplexers, an adder may be unnecessary.

The second operation unit 130 may include a multiplier that performs a multiplication operation on output data from the first operation unit 120 and a coefficient corresponding to the output data among the coefficient data, and a second accumulator for accumulating the output of the multiplier to obtain a result of the convolution operation. Here, the multiplier is a logic circuit that multiplies one or more of a plurality of inputs that are simultaneously input and outputs a multiplied value of the one or more of the plurality of inputs.

However, the one or more embodiments are not limited thereto, and the second operation unit 130 may include a plurality of accumulators, and the number of accumulators included in the second operation unit 130 may vary according to a quantization method of kernel data.

The memory 110 may further store other coefficient data and other identification code data in which other kernel data is quantized, and the electronic apparatus 100 may further include a third operation unit and a fourth operation unit.

When a plurality of target elements of target data are sequentially input, the third operation unit may select the other output value corresponding to the sequentially input target element based on the other identification code corresponding to the input target element from among other identification code data, and accumulate the selected other output value. In other words, the third operation unit has the same structure as the first operation unit 120 and performs the same operation, but input data may be different. Specifically, the first operation unit 120 and the third operation unit sequentially receive the same target element from among a plurality of target elements included in the target data, but the first operation unit 120 may use the kernel data to process the target element, and the third operation unit 120 may process the target element using the other kernel data.

The fourth operation unit may output a convolution operation result based on the other coefficient corresponding to other output data and the other coefficient data output from the third operation unit. In other words, the fourth operation unit has the same structure as the second operation unit 130 and performs the same operation, but input data may be different.

Due to the above structure, the electronic apparatus 100 may perform parallel processing using a plurality of kernel data.

The memory 110 may include a first buffer in which coefficient data is stored and a second buffer in which identification code data is stored.

The first operation unit 120 may receive an identification code corresponding to the input target element from the second buffer, and the second operation unit 130 may receive a coefficient corresponding to the output data from the first buffer.

However, the one or more embodiments are not limited thereto, and the first buffer and the second buffer may be provided separately from the memory 110. For example, the first buffer may receive and store a part of coefficient data from the memory 110, provide a coefficient corresponding to the output data to the second operation unit 130, and the second buffer may receive and store a part of the identification code data from the memory 110, and provide an identification code corresponding to the target element to the first operation unit 120.

According to various embodiments of the disclosure as described above, the electronic apparatus may reduce power consumption and hardware area by minimizing a multiplication operation by modifying an operation method of some multiplication operations while performing a convolution operation.

Hereinafter, an embodiment of the disclosure will be described in more detail with reference to the accompanying drawings.

Figure 3:
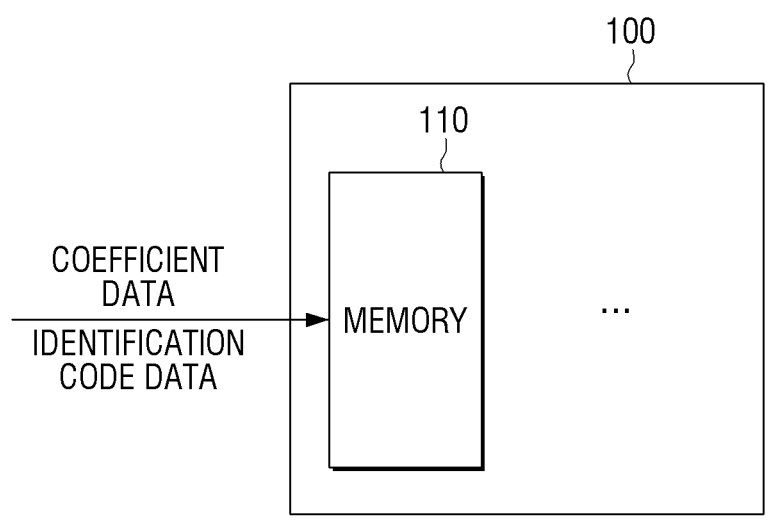
FIG. 3 is a view illustrating a method of transforming a multiplication operation using coefficient data and identification code data according to an embodiment.

FIG. 3 is a view illustrating a method of transforming a multiplication operation using coefficient data and identification code data according to an embodiment.

The electronic apparatus 100 may receive the coefficient data and the identification code data from the outside and store them in the memory 110.

Here, the coefficient data and the identification code data are a result of quantization of kernel data in a three-dimensional form as shown in FIG. 1. For example, the kernel data may be quantized into coefficient data and identification code data as shown in Equation 2-1 below.

$$W[m] = \sum_{li}^{Q_{bit}} A[n] \times B[m][n] \qquad \text{[Equation2-1]}$$

Here, W[m] is kernel data, A[n] is coefficient data including values shared by a plurality of elements included in the kernel data, B[m][n] is identification code data dependent on a coefficient, and may include an identification code that may be one of −1, 0, or 1. Each of the plurality of elements included in the kernel data may be expressed as a corresponding coefficient and a corresponding identification code. m is an identifier indicating a position of the coefficient, $Q_{bit}$ may be a number of dimensions for representing an element included in the kernel data.

Equation 2-1 represents a general formula for quantizing kernel data, and various modifications are possible according to a sharing method of a plurality of elements included in the kernel data. For example, when the i-axis and the j-axis share the same elements, quantization is possible as shown in Equation 2-2, and when all elements are shared, quantization as shown in Equation 2-3 is possible.

$$W[i][j][k][z] = \sum_{n}^{Q_{bit}} A[i][j][z][n] \times B[i][j][k][z][n] \quad \text{[Equation 2-2]}$$

$$W[i][j][k][z] = \sum_{n}^{Q_{bit}} A[z][n] \times B[i][j][k][z][n] \quad \text{[Equation 2-3]}$$

Alternatively or additionally, quantization as in Equation 2-4 may be possible by expressing the coefficient data as an unsigned 8-bit integer, and in this case, B[m][n] may include an identification code that is one of 0 and 1.

$$W[m] = \sum_{n=0}^{7} 2^n \times B[m][n] \quad \text{[Equation 2-4]}$$

Alternatively or additionally, quantization as shown in Equation 2-5 may be possible using an alternating multi-bit quantization (AMbQ) quantization algorithm, and in this case, B[m][n] may include an identification code that is one of −1 and 1.

$$W[m] = \sum_{n}^{Q_{bit}} A[n] \times B[m][n] \quad \text{[Equation 2-5]}$$

Equations 2-2 to 2-5 indicate a quantization method according to an embodiment, and are not limited thereto, and kernel data may be quantized in various methods. Hereinafter, for convenience of description, it is assumed that quantization is performed in the method of Equation 2-3.

It has been described that the electronic apparatus 100 receives the coefficient data and the identification code data in which the kernel data is quantized, but the one or more embodiments are not limited thereto, and the electronic apparatus 100 may receive the kernel data and directly quantize the received kernel data into coefficient data and identification code data.

After the kernel data is quantized in the method described above, before describing a method of obtaining a convolution operation result of the electronic apparatus 100, a method of transforming a multiplication operation using coefficient data and identification code data will be described.

If W[i][j][k][z] in Equation 1 is substituted with Equation 2-3, it may be expressed as Equation 3-1 below, and a calculation order of Equation 3-1 is changed to express as Equation 3-2.

$$O[x][y][z] = \sum_{i}^{F_W} \sum_{j}^{F_H} \sum_{k}^{I_D} I[x+i][y+j][k] \times \left( \sum_{n}^{Q_{bit}} A[z][n] \times B[i][j][k][z][n] \right) \quad \text{[Equation 3-1]}$$

$$O[x][y][z] = \sum_{n}^{Q_{bit}} A[z][n] \times \left( \sum_{i}^{F_W} \sum_{j}^{F_H} \sum_{k}^{I_D} I[x+i][y+j][k] \times B[i][j][k][z][n] \right) \quad \text{[Equation 3-2]}$$

A multiplication number of times of the conventional equation (1) is $F_W \times F_H \times I_D$, a multiplication number of times within the brackets of Equation 3-2 is $F_W \times F_H \times I_D \times Q_{bit}$, and a multiplication number of times outside the brackets of Equation 3-2 is $Q_{bit}$. In other words, when the operation of Equation 1 is transformed as in Equation 3-2, the number of multiplications increases.

However, since B[i][j][k][z][n] includes an identification code that is one of −1, 0, and 1, the inside of brackets in Equation 3-2 does not need to be implemented as a multiplier. Specifically, a multiplication result of I[x+i][y+j][k] and B[i][j][k][z][n] in brackets is one of −I[x+i][y+j][k], 0, one of I[x+i][y+j][k].

This may be implemented with a simple selection circuit, and may significantly reduce hardware area and energy consumption compared to the multiplier.

The number of multiplication outside the brackets is $Q_{bit}$, but $Q_{bit}$ is much smaller than the conventional $F_W \times F_H \times I_D$, it does not significantly affect the overall energy consumption.

Accordingly, the hardware area and energy consumption may be reduced by transforming the multiplication circuit inside the brackets into the selection circuit, and a specific hardware structure will be described below.

Figure 4:
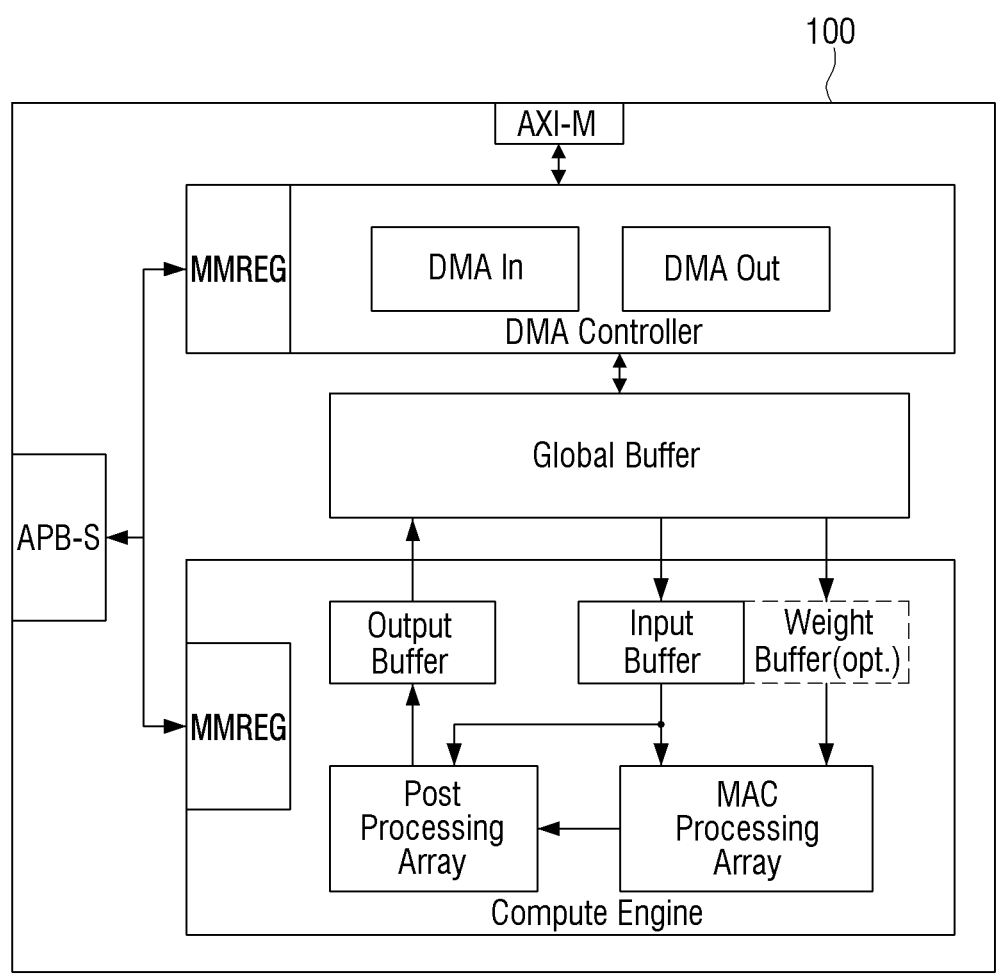
FIG. 4 is a view illustrating a detailed electronic apparatus according to an embodiment.

FIG. 4 is a view illustrating a detailed electronic apparatus 100 according to an embodiment.

As illustrated in FIG. 4, the electronic apparatus 100 may be implemented in a form of a neural network accelerator.

A global buffer may be a memory for storing target data and kernel data. Here, the global buffer may store kernel data as coefficient data and identification code data.

The global buffer may generally include a plurality of memory modules, such as on-chip SRAM, and a controller controlling them. Alternatively, the global buffer may be divided into a first buffer for storing target data and a second buffer for storing kernel data, rather than a single buffer.

A direct memory access controller (DMA) controller may be configured to perform data transfer between a memory external to the electronic apparatus 100 and a global buffer. "DMA In" may be a configuration for transferring data from the external memory to the global buffer, and "DMA Out" may be a configuration for transferring data from the global buffer to the external memory.

A computation engine is a configuration capable of performing computation of an artificial intelligence model, and may be implemented in various ways. For example, the computation engine may include a configuration (MAC Processing Array, MPA) for performing MAC operations, an activation function, and a configuration (Post Processing Array, PPA) capable of performing the remaining operations such as elementwise sum. Alternatively, the MPA may perform a pooling operation in addition to the MAC operation. Alternatively or additionally, the operation engine may further include at least one buffer. The at least one buffer has a smaller capacity than the global buffer, and may be used for data reuse or latency hiding of the global buffer.

The electronic apparatus 100 may include at least one interface for communicating with external devices. For example, APB-S and MMRE.G may be interfaces for controlling the electronic apparatus 100 through a memory-mapped I/O method from an external host such as a CPU, and AXI-M may be an interface for the electronic apparatus 100 to access an external memory.

The implementation example of FIG. 4 is merely an example, and the electronic apparatus 100 may be implemented in any number of other forms. In addition, some of the components of FIG. 4 may be implemented in a combined form into one component, or one of the components of FIG. 4 may be implemented as a divided form into a plurality of components.

Figure 5:
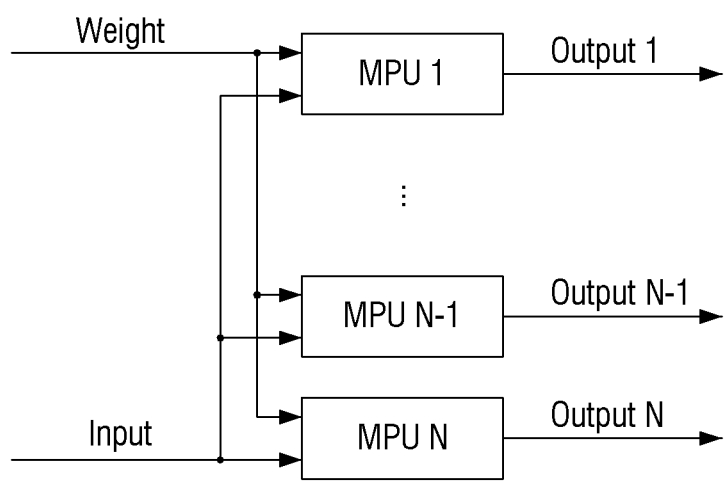
FIG. 5 is a view illustrating a MAC Processing Array (MPA) according to an embodiment.

FIG. 5 is a view illustrating a MAC Processing Array (MPA) according to an embodiment.

As shown in FIG. 5, the MPA may include a plurality of MAC processing units (MPUs). Here, each of the plurality of MPUs may be configured to perform a MAC operation.

A plurality of MPUs may perform the MAC operation in various ways. For example, one MPU may process a plurality of MAC operations in parallel. Alternatively, the plurality of MPUs may share some data or reduce the number of accesses to the global buffer by including a configuration that can store data inside the MPU.

The plurality of MPU may receive kernel data from the global buffer (preloading). Here, the plurality of MPUs may receive different kernel data. For example, MPU 1 may receive kernel data 1, and MPU 2 may receive kernel data 2. Here, the received kernel data may be in a quantized form. In other words, the MPU 1 may receive coefficient data 1 and identification code data 1, and the MPU 2 may receive coefficient data 2 and identification code data 2.

The plurality of MPUs may sequentially receive a plurality of target elements included in the target data from the global buffer. In this case, unlike the kernel data, the plurality of MPUs may all receive the same target element. Accordingly, the number of times the target element is read from the global buffer may be reduced by a factor of the number of the plurality of MPUs. Also, since the same kernel data is used whenever a new target element is input, the number of times the kernel data is read from the global buffer may be reduced.

A detailed operation method of the MPU will be described with reference to FIGS. 6 to 8.

Figure 6:
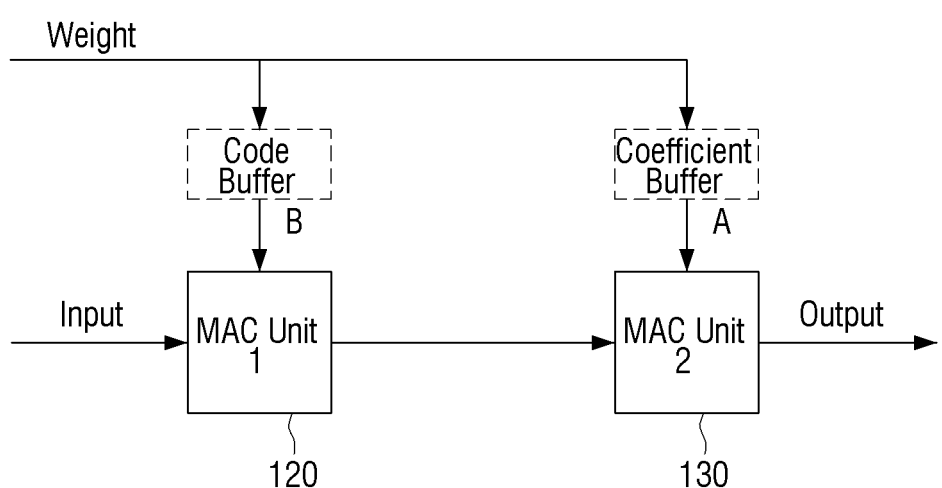
FIG. 6 is a view illustrating a MAC processing unit (MPU) according to an embodiment.

FIG. 6 is a view illustrating a MAC processing unit (MPU) according to an embodiment.

The MPU may include an identification code buffer, a coefficient buffer, a first operation unit (MAC Unit 1, 120) and a second operation unit (MAC Unit 2, 130), as shown in FIG. 6.

The identification code buffer may store the identification code data, and the coefficient buffer may store the coefficient data.

The first operation unit 120 may obtain a multiplication operation result of a target element of a target data and an identification code received from an identification code buffer. In other words, the first operation unit 120 obtains a multiplication result of the target elements of the target data and the identification code received from the identification code buffer, but does not perform the multiplication operation. The first operation unit 120 may perform the multiplication operation by transforming it into a selection operation as in the method described with reference to FIG. 3, but the obtained result may be the same as the result of the multiplication operation.

In the above description, it has been described that the first operation unit 120 operates one target element and one identification code, for convenience of description, but this is only an example, and the first operation unit 120 may be configured variously. For example, the first operation unit 120 may receive a plurality of target elements and a plurality of identification codes respectively corresponding to the plurality of target elements, and process the plurality of target elements and the plurality of identification codes in parallel.

The first operation unit 120 may accumulate and store the obtained multiplication operation results. Specifically, the first operation unit 120 may accumulate and store the result of the multiplication operation until an operation inside the brackets of Equation 3-2 is completed, and provide the accumulated data to the second operation unit 130 as output data, when the operation inside the brackets of Equation 3-2 is completed.

The second operation unit 130 may perform a multiplication operation on a first output data output from the first operation unit and a coefficient corresponding to the first output data among the coefficient data, and store a result of the first multiplication operation.

The second operation unit 130 may perform a multiplication operation on a second output data output from the first operation unit and a coefficient corresponding to the second output data among the coefficient data, and accumulate and store a result of the second multiplication operation result to the first multiplication operation result.

The second operation unit 130 of Equation 3-2 may perform multiplication and accumulation operations as many times as $Q_{bit}$, and output the accumulated data as a convolution operation result.

A hardware implementation example of the first operation unit 120 and the second operation unit 130 will be described with reference to FIGS. 7 and 8.

Figure 7:
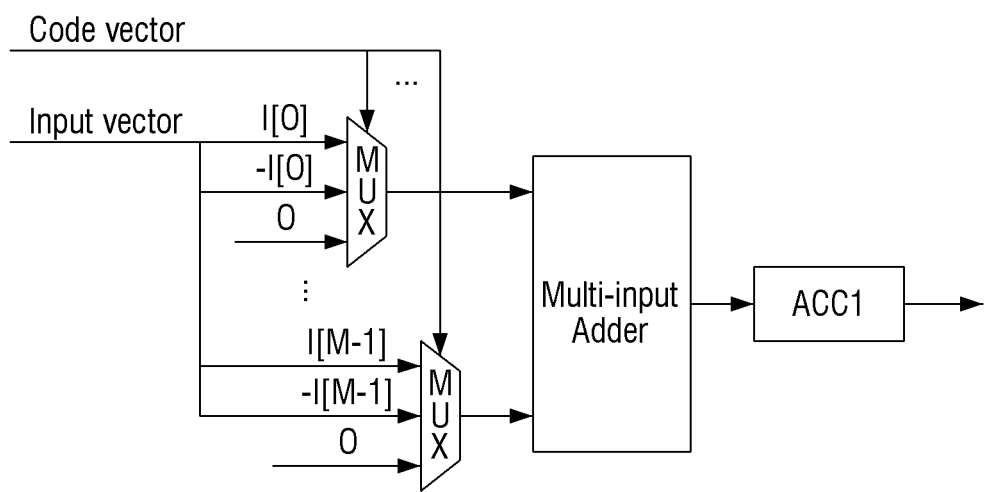
FIG. 7 is a view illustrating an implementation example of a first operation unit according to an embodiment.

FIG. 7 is a view illustrating an implementation example of the first operation unit 120 according to an embodiment.

As shown in FIG. 7, the first operation unit 120 may include a plurality of multiplexers (MUX), an adder (multi-input adder), and a first accumulator (ACC1).

Each of the plurality of multiplexers may receive a target element, a zero value, and an inversion value of the target element, and output one of the target element, the zero value, and the inversion value of the target element based on an identification code corresponding to the target element.

An inverter for inverting a target element may be provided at a front end of each of the plurality of multiplexers.

The adder may perform an addition operation on data simultaneously output from the plurality of multiplexers.

The first accumulator may perform an addition operation on data sequentially output from the adder.

The number of multiplications in the brackets in Equation 3-2 is, and generally the number of the plurality of multiplexers is generally smaller than. Thus, the first accumulator may sequentially accumulate multiplication operation results, and may output the accumulated data as output data when the number of accumulated multiplication operation results becomes $F_W \times F_H \times I_D \times Q_{bit}$.

As described above, the first operation unit 120 may obtain a multiplication operation result without performing a multiplication operation. In addition, the first operation unit 120 may not use a multiplier and use a multiplexer to reduce hardware area and energy consumption.

Figure 8:
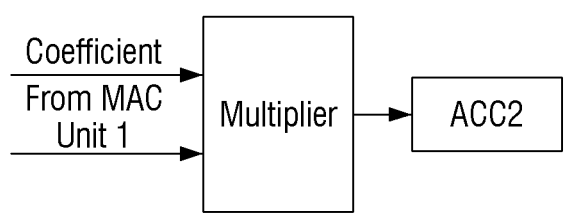
FIG. 8 is a view illustrating an implementation example of a second operation unit according to an embodiment.

FIG. 8 is a view illustrating an example of implementation of the second operation unit 130 according to an embodiment.

The second operation unit 130 may include a multiplier and a second accumulator ACC2 as shown in FIG. 8.

The multiplier may perform a multiplication operation of a coefficient corresponding to the output data among the output data and the coefficient data output from the first operation unit 120.

The second accumulator may perform an addition operation on data sequentially output from the multiplier.

The number of multiplication outside the brackets of Equation 3-2 is $Q_{bit}$, the second accumulator may sequentially accumulate a result of the multiplication, and output the accumulated data as a result of a convolution operation when the number of the accumulated multiplication becomes $Q_{bit}$.

It has been assumed that a calculation order is modified as in Equation 3-2, but the calculation order may be modified in various other ways. For example, Equation 3-1 may be transformed into Equation 3-3 as follows.

$$O[x][y][z] = \sum_{j}^{F_H} \sum_{n}^{Q_{bit}} A[z][n] \times \left( \sum_{i}^{F_W} \sum_{k}^{I_D} I[x+i][y+j][k] \times B[i][j][k][z][n] \right)$$ [Equation 3-3]

In this case, the first operation unit 120 may be implemented in the same form, but a time point at which the first accumulator outputs the output data may vary. Specifically, the first accumulator may sequentially accumulate a multiplication result, and output the accumulated data as the output data when the number of the accumulated multiplication operation result becomes $F_W \times I_D \times Q_{bit}$.

The second operation unit 130 may further include a third accumulator in addition to the multiplier and the second accumulator ACC2. The third accumulator may be configured to accumulate multiplication operations as much as $F_H$ outside the brackets of Equation 3-3.

In other words, an internal structure and operation of each of the first operation unit 120 and the second operation unit 130 may be implemented differently depending on a data reuse method, an implementation method, or the like.

For example, the first accumulator, the second accumulator and the third accumulator may be designed to directly output an input or a sum of an input and a stored value as an output (bypass function). Alternatively, a part of the multiplier and the second accumulator may be implemented as one configuration. For example, the multiplier may be implemented in a form including an addition of the second accumulator.

Figure 9:
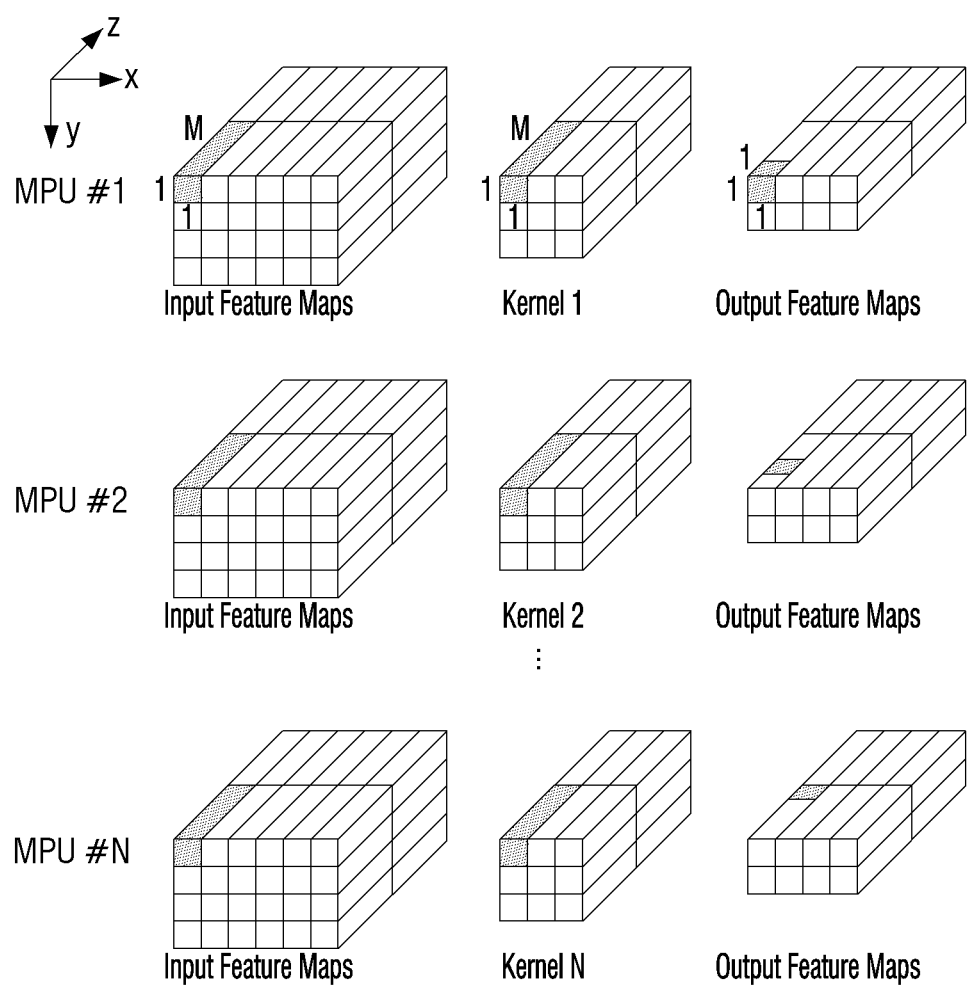
FIG. 9 is a view illustrating spatial mapping according to an embodiment.

FIG. 9 is a view illustrating spatial mapping according to an embodiment.

Spatial mapping refers to a method in which a convolutional layer operation formula (algorithm) is allocated to the MPA at a certain point in time (cycle).

Before describing spatial mapping, it is assumed that the MPA includes N MPUs, and the number of parallel processing of kernel data of each of the plurality of MPUs is M.

Each of the plurality of MPUs may receive data of a 1×1×M area of a plurality of three-dimensional kernel data. For example, MPU 1 may receive data of a 1×1×M area of three-dimensional kernel data 1, and MPU 2 may receive data of a 1×1×M area of three-dimensional kernel data 2. Each of the plurality of MPUs may store the received kernel data in an identification code buffer and a counting buffer (preloading or prefetching).

A plurality of MPUs may receive the data of the 1×1×M area of the three-dimensional target data (broadcasting). Here, the data received by the plurality of MPUs may all be the same.

Each of the plurality of MPUs may operate the kernel data and target data stored in an internal buffer, which may be a 1×1×1 area of three-dimensional output data (output feature maps).

This mapping method is illustrated in FIG. 9, and the MPA may perform matrix-vector multiplication of an N×M kernel data matrix and M×1 target data in every cycle.

Figure 10A:
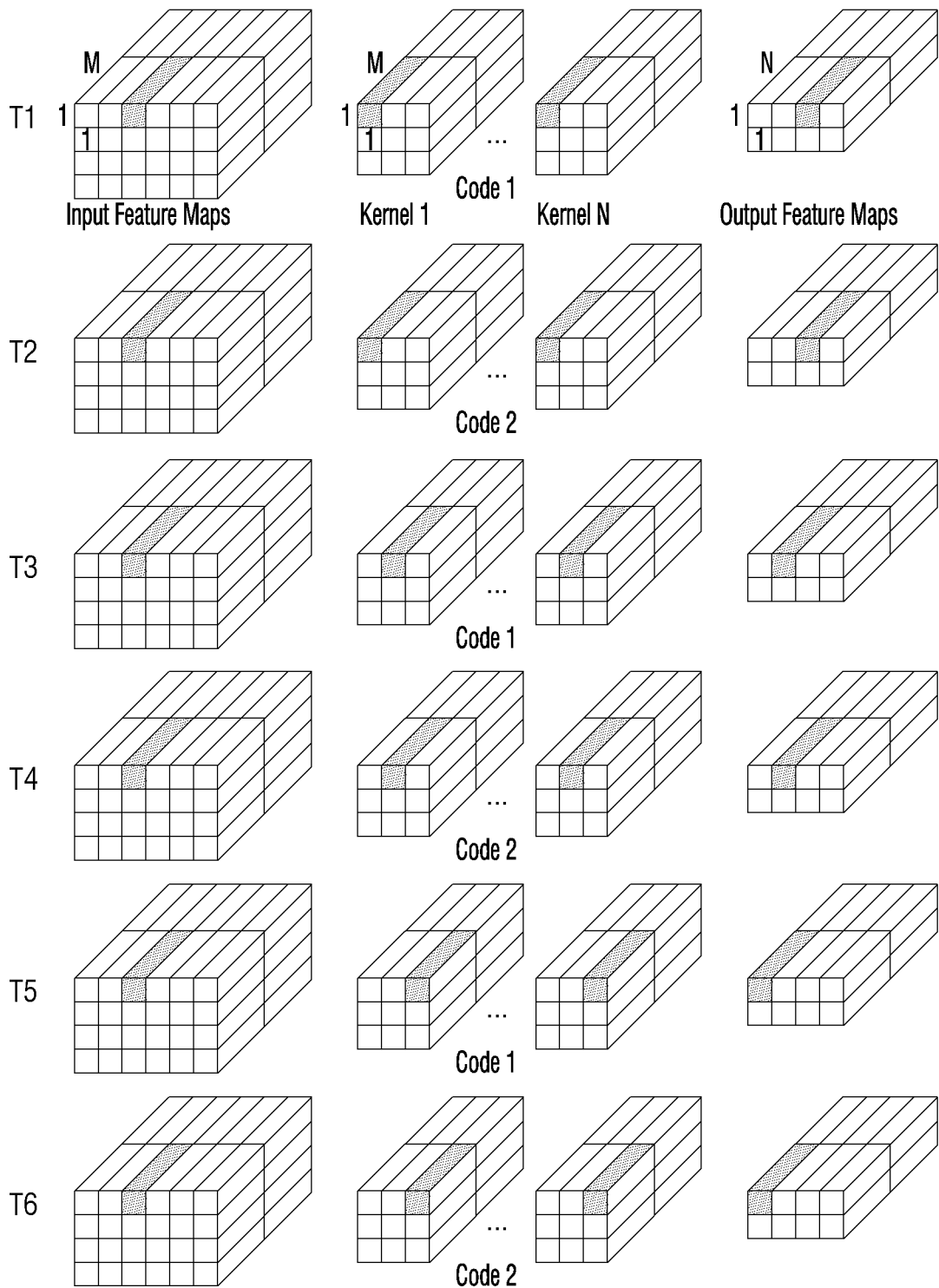
FIGS. 10A and 10B are views illustrating time mapping according to an embodiment.
Figure 10B:
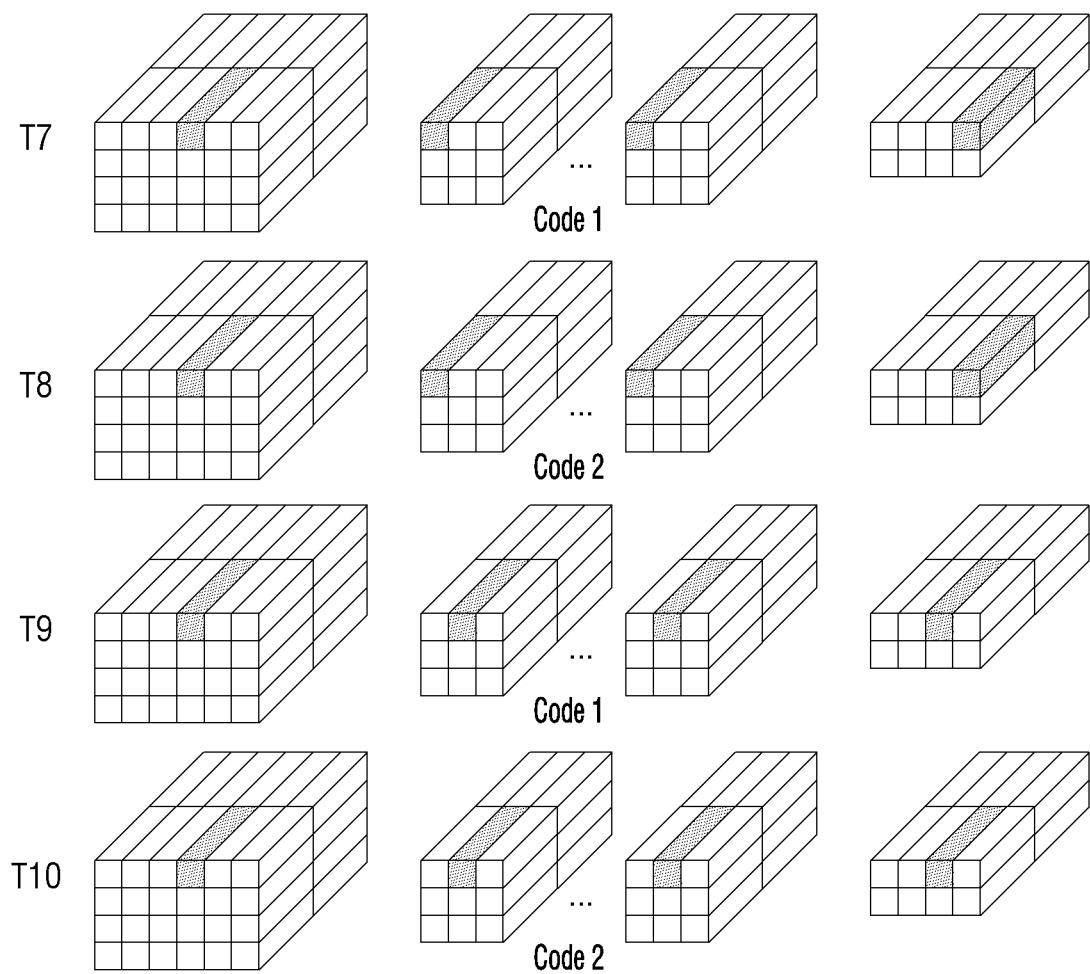

FIGS. 10A and 10B are views illustrating time mapping according to an embodiment.

Time mapping refers to a method in which an assignment of a convolution layer calculation formula (algorithm) to MPA is changed over time.

According to Equation 3-3, in order to reduce energy consumption, target data that has been read once may be reused by a maximum of $F_H \times Q_{bit}$. In other words, the MPA may receive new target data once in a maximum $F_H \times O_{bit}$ cycle, and during this time, each of the plurality of MPUs may perform an operation using new kernel data every time.

FIGS. 10A and 10B illustrate that one 1×1×M target data is reused for six cycles for a case where $F_H$ and $Q_{bit}$ are 3 and 2, respectively.

Considering the time mapping, the identification code buffer and the coefficient buffer of the MPU may require a space that can contain a plurality of 1×1×M data (at least the maximum number of $F_H \times Q_{bit}$ supported by the electronic apparatus 100), and a plurality of 1×1×M data at the time of preloading may be stored in the buffer.

$F_H \times Q_{bit}$ operation results operated with one target data may be stored in different storage spaces of the first accumulation, and thus the first accumulation may include a space capable of storing at least the maximum number of $F_H \times Q_{bit}$ values supported by the electronic apparatus 100.

When the maximum $F_H \times Q_{bit}$ cycle has elapsed, the MPA may receive data of a new 1×1×M area adjacent in an x-axis direction from the same memory as the input buffer of FIG. 4, and repeat the above process as illustrated in FIG. 10B. An addition operation may be performed on some of the newly calculated results that may be previously operated, and an addition operation may be performed with a result stored in the first accumulator of the first operation unit 120, and in this method, the MPA may perform one-dimensional convolution in the x-axis direction.

For example, the first accumulator may add and store the operation result calculated in a T1 cycle of FIG. 10A and the operation result calculated in a T9 cycle of FIG. 10B. When the maximum number of $F_H$ operation results involved in a calculation of one 1×1×N output area in the first accumulator, the accumulated data may be provided to the second operation unit 130.

The multiplier of the second operation unit 130 may multiply $Q_{bit}$ accumulated data involved in the operation of one 1×1×N output area and $Q_{bit}$ coefficients corresponding thereto, and the second accumulator may accumulate $Q_{bit}$ multiplication results. The adder may output a new result every cycle, but the first accumulator and the multiplier may output a valid result once in an average $F_H$ cycle, and the second accumulator once in a $F_H \times Q_{bit}$ cycle.

The third accumulator may store intermediate operation and final operation results of the plurality of 1×1×N output areas. When a height ($F_H$) of kernel data is greater than 1 or a depth ($I_D$) of the target data is greater than M, the above process may be repeated $F_H \times I_D$ times. Here, the third accumulator may accumulate and store results of the second accumulator participating in the same 1×1×N output operation.

As described with reference to FIGS. 9 to 10B, the number of times of reading kernel data and target data is reduced by spatial mapping and time mapping, thereby reducing energy consumption.

Figure 11:
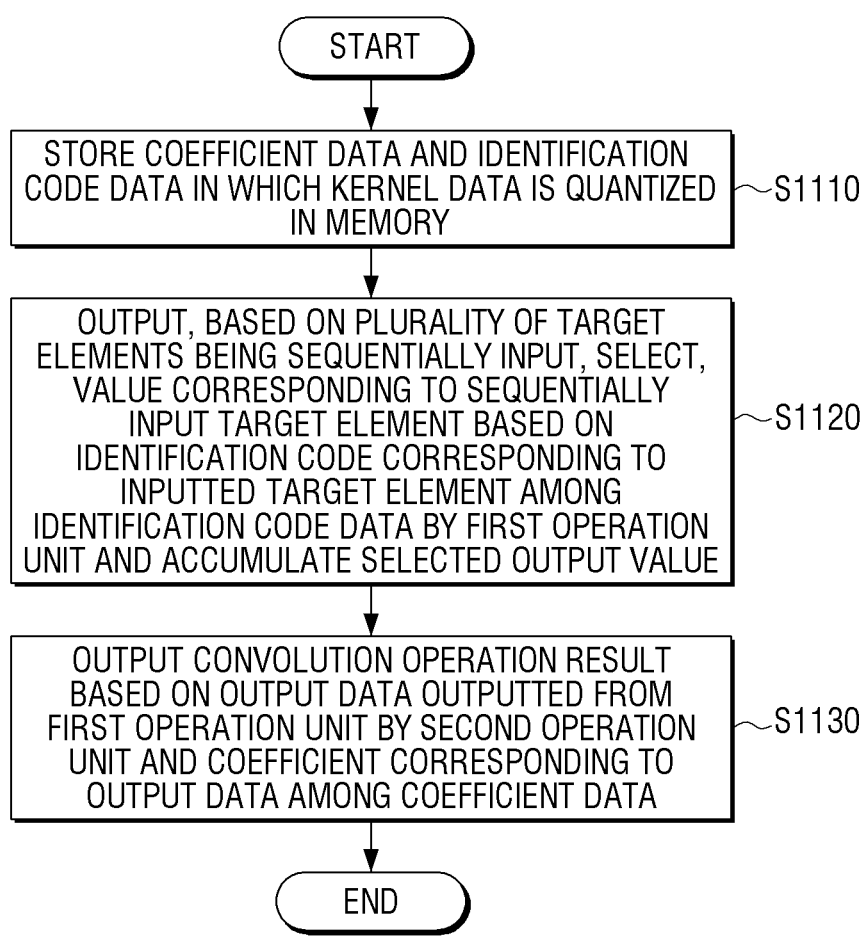
FIG. 11 is a flowchart illustrating a method of controlling an electronic apparatus according to an embodiment.

FIG. 11 is a flowchart illustrating a method of controlling an electronic apparatus according to an embodiment.

Coefficient data and identification code data in which kernel data is quantized may be stored in a memory (S1110). When a plurality of target elements of target data are sequentially input, an output value corresponding to the sequentially input target element may be selected based on an identification code corresponding to the input target element among the identification code data by a first operation unit, and the selected output values may be accumulated (S1120). In addition, a convolution operation result may be output based on the coefficient corresponding to the output data among the output data and the coefficient data output from the first operation unit by a second operation unit (S1130).

The operation of accumulating the selected output value (S1120) may select one of a zero value, a sequentially input target element, and an inversion value of a sequentially input target element, as an output value based on an identification code corresponding to the input target element.

In addition, the operation of accumulating the selected output values (S1120) may output the accumulated data as output data when sequentially selected output values are accumulated for a predetermined number of times.

The operation of outputting a convolution operation result (S1130) may perform multiplication on coefficients corresponding to the output data sequentially input among the coefficient data and output data sequentially input, when a plurality of output data is sequentially input from the first operation unit, and accumulate and output an operation result as a result of a convolution operation.

The identification code data may include a plurality of identification codes each of which is expressed as one of −1, 0, and 1, and the coefficient data may include a plurality of coefficients indicating each of a plurality of elements included in the kernel data based on the plurality of identification codes.

The first operation unit may include a plurality of multiplexers, an adder for adding outputs of the plurality of multiplexers, and a first accumulator for accumulating outputs of the adders to obtain output data, and an operation of accumulating selected output values (S1120) may output one of a zero value, an input target element, and an inversion value of the input target element as an output value based on an identification code corresponding to an input target element among the identification code data by each of the plurality of multiplexers.

In addition, the second operation unit may include a multiplier for performing a multiplication operation on a coefficient corresponding to the output data among the output data and the coefficient data, and a second accumulator for accumulating the output of the multiplier to obtain a convolution operation result.

The operation of storing the other coefficient data and the other kernel data may be quantized as well as the other identification code data in a memory, and when a plurality of target elements of the target data are sequentially input, selecting the other output value corresponding to a target element sequentially inputted based on the other identification code corresponding to the target element input among the other identification code data by the third operation unit to accumulate the selected output value, and outputting a convolution operation result based on the other coefficient corresponding to the other output data among the other output data and the other coefficient data output from the third operation unit by a fourth operation unit.

Here, the first operation unit and the third operation unit may sequentially receive the same target element from among a plurality of target elements included in the target data.

In addition, the memory may include a first buffer in which the coefficient data is stored and a second buffer in which the identification code data is stored, and the operation of accumulating the selected output value (S1120) may receive an identification code corresponding to the input target element from the second buffer and, the operation of outputting the result of the convolution (S1130) may receive a coefficient corresponding to the output data from the first buffer.

According to various embodiments of the disclosure as described above, the electronic apparatus may reduce power consumption and hardware area by minimizing a multiplication operation by modifying an operation method of some multiplication operations while performing a convolution operation.

In addition, the electronic apparatus may efficiently reuse data by reducing the number of times data is read from an external memory by modifying an operation method of some multiplication operations.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Various embodiments described above may be embodied in a recording medium that may be read by a computer or a similar apparatus to the computer by using software, hardware, or a combination thereof. In some cases, the embodiments described herein may be implemented by the processor itself. In a software configuration, various embodiments described in the disclosure such as a procedure and a function may be embodied as separate software modules. The software modules may respectively perform one or more functions and operations described in the present specification.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device. The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

While the embodiments of the disclosure has been shown and described with reference to the accompanying drawings, it will be understood by those skilled in the art that various changes in form and details may be made therein without departing from the spirit and scope of the disclosure as defined by the appended claims and their equivalents.

What is claimed is:

1. An electronic apparatus comprising:
a memory configured to store coefficient data and identification code data that are quantized kernel data, the kernel data being weight data in an artificial intelligence model;
a first operation circuit comprising a multiplexer, the first operation circuit being configured to:
select, using the multiplexer, an output value corresponding to one of a plurality of target elements of target data that are sequentially input, wherein the selection of the output value is based on an identification code corresponding to the one of the plurality of target elements; and
accumulate the selected output value; and
a second operation circuit configured to output a convolution operation result based on output data that is output from the first operation circuit and a coefficient corresponding to the output data.

2. The electronic apparatus of claim 1, wherein the first operation circuit is further configured to, based on the identification code corresponding to the one of the plurality of target elements, select, as the output value, one of a zero value, the one of the plurality of target elements, and an inversion value of the one of the plurality of target elements.

3. The electronic apparatus of claim 1, wherein the first operation circuit is further configured to, based on the selected output value being accumulated sequentially for a predetermined number of times, output the accumulated data as the output data.

4. The electronic apparatus of claim 3, wherein the second operation circuit is further configured to, based on a plurality of output data being sequentially input from the first operation circuit, perform a multiplication operation on one of the plurality of output data and a coefficient corresponding to the one of the plurality of output data, accumulate a multiplication result of the multiplication operation and output an accumulation result as the convolution operation result.

5. The electronic apparatus of claim 1, wherein the identification code data comprises a plurality of identification codes, each of which is the plurality of identification codes being represented as one of −1, 0, or 1, and
wherein the coefficient data comprises a plurality of coefficients indicating each of the plurality of target elements included in the kernel data based on the plurality of identification codes.

6. The electronic apparatus of claim 1, wherein the first operation circuit comprises:
a plurality of multiplexers;
an adder configured to add outputs of the plurality of multiplexers; and
a first accumulator configured to obtain the output data by accumulating outputs of the adder, and
wherein each of the plurality of multiplexers is configured to output one of a zero value, the one of the plurality of target elements, and an inversion value of the one of the plurality of target elements, based on the identification code corresponding to the one of the plurality of target elements.

7. The electronic apparatus of claim 1, wherein the second operation circuit comprises:
a multiplier configured to perform a multiplication operation on the output data and the coefficient corresponding to the output data; and
a second accumulator configured to accumulate the output of the multiplier to obtain the convolution operation result.

8. The electronic apparatus of claim 1, wherein the memory is configured to further store another coefficient data and another identification code data in which another kernel data is quantized, and
wherein the electronic apparatus further comprises:
a third operation circuit configured to, based on the plurality of target elements of the target data being sequentially input, select another output value corresponding to at least another one of the plurality of target elements that is sequentially input according to another identification code corresponding to the another of the plurality of target elements, and accumulate the selected another output value; and
a fourth operation circuit configured to output the convolution operation result, based on another coefficient corresponding to the another output value that is output from the third operation circuit and the another coefficient data.

9. The electronic apparatus of claim 8, wherein the first operation circuit and the third operation circuit are configured to sequentially receive the same target element among the plurality of target elements included in the target data.

10. The electronic apparatus of claim 1, wherein the memory further comprises:
a first buffer storing the coefficient data; and
a second buffer storing the identification code data,
wherein the first operation circuit is configured to receive an identification code corresponding to an input target element from the second buffer, and
wherein the second operation circuit is configured to receive the coefficient corresponding to the output data from the first buffer.

11. A method for controlling an electronic apparatus including a memory, a first operation circuit comprising a multiplexer, and a second operation circuit, the method comprising:
storing coefficient data and identification code data that are quantized kernel data, the kernel data being weight data in an artificial intelligence model; and
by the first operation circuit:
selecting, using the multiplexer, an output value corresponding to one of a plurality of target elements of target data that are sequentially input, wherein the selecting the output value is based on an identification code corresponding to the one of the plurality of target elements; and
accumulating the selected output value; and
outputting, by the second operation circuit, a convolution operation result based on output data that is output from the first operation circuit and a coefficient corresponding to the output data.

12. The method of claim 11, wherein the accumulating the selected output value comprises, based on the identification code corresponding to the one of the plurality of target elements, selecting, as the output value, one of a zero value, the one of the plurality of target elements, and an inversion value of the one of the plurality of target elements.

13. The method of claim 11, wherein the accumulating the selected output value comprises, based on the selected output value being accumulated sequentially for a predetermined number of times, outputting the accumulated data as the output data.

14. The method of claim 13, wherein the outputting the convolution operation result comprises, based on a plurality of output data being sequentially input from the first operation circuit, performing a multiplication operation on one of the plurality of output data and a coefficient corresponding to the one of the plurality of output data, accumulating a multiplication result of the multiplication operation and outputting an accumulation result as the convolution operation result.

15. The method of claim 11, wherein the identification code data comprises a plurality of identification codes, each of the plurality of identification codes being represented as one of −1, 0, or 1, and
wherein the coefficient data comprises a plurality of coefficients indicating each of the plurality of target elements included in the kernel data based on the plurality of identification codes.

* * * * *